United States Patent
Ambardekar et al.

(10) Patent No.: US 11,604,972 B2
(45) Date of Patent: Mar. 14, 2023

(54) INCREASED PRECISION NEURAL PROCESSING ELEMENT

(71) Applicant: MICROSOFT TECHNOLOGY LICENSING, LLC, Redmond, WA (US)

(72) Inventors: Amol A Ambardekar, Redmond, WA (US); Boris Bobrov, Kirkland, WA (US); Kent D. Cedola, Bellevue, WA (US); Chad Balling McBride, North Bend, WA (US); George Petre, Redmond, WA (US); Larry Marvin Wall, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 858 days.

(21) Appl. No.: 16/457,828

(22) Filed: Jun. 28, 2019

(65) Prior Publication Data

US 2020/0410329 A1   Dec. 31, 2020

(51) Int. Cl.
*G06F 7/499* (2006.01)
*G06F 7/523* (2006.01)
(Continued)

(52) U.S. Cl.
CPC ......... *G06N 3/063* (2013.01); *G06F 7/49994* (2013.01); *G06F 7/523* (2013.01); *G06F 7/57* (2013.01); *G06F 9/30029* (2013.01)

(58) Field of Classification Search
CPC ......... G06F 7/49994; G06F 7/523; G06F 7/57
See application file for complete search history.

(56) References Cited

U.S. PATENT DOCUMENTS 5,572,235 A   11/1996   Mical et al.
5,754,805 A   5/1998    Gallup et al.
(Continued)

FOREIGN PATENT DOCUMENTS

EP   3480691 A1 *   5/2019   ............ G06F 17/16

OTHER PUBLICATIONS

"US Non Provisional Application Filed under U.S. Appl. No. 15/853,458", filed Dec. 22, 2017, 46 Pages.
(Continued)

*Primary Examiner* — Michael D. Yaary
(74) *Attorney, Agent, or Firm* — Newport IP, LLC; Leonard J. Hope

(57) ABSTRACT

Neural processing elements are configured with a hardware AND gate configured to perform a logical AND operation between a sign extend signal and a most significant bit ("MSB") of an operand. The state of the sign extend signal can be based upon a type of a layer of a deep neural network ("DNN") that generate the operand. If the sign extend signal is logical FALSE, no sign extension is performed. If the sign extend signal is logical TRUE, a concatenator concatenates the output of the hardware AND gate and the operand, thereby extending the operand from an N-bit unsigned binary value to an N+1 bit signed binary value. The neural processing element can also include another hardware AND gate and another concatenator for processing another operand similarly. The outputs of the concatenators for both operands are provided to a hardware binary multiplier.

18 Claims, 7 Drawing Sheets

(51) Int. Cl.
*G06F 7/57* (2006.01)
*G06F 9/30* (2018.01)
*G06N 3/063* (2006.01)

(56) References Cited

U.S. PATENT DOCUMENTS

| | | |
|---|---|---|
| 5,880,985 A | 3/1999 | Makineni et al. |
| 6,081,823 A | 6/2000 | Purcell et al. |
| 6,370,559 B1 | 4/2002 | Hoffman |
| 6,539,368 B1 | 3/2003 | Chernikov et al. |
| 6,915,322 B2 | 7/2005 | Hong |
| 2004/0010536 A1 | 1/2004 | Moreno et al. |
| 2017/0102920 A1 | 4/2017 | Henry et al. |
| 2017/0123793 A1 | 5/2017 | Sperber et al. |
| 2017/0220929 A1 | 8/2017 | Rozen et al. |
| 2017/0357891 A1 | 12/2017 | Judd et al. |
| 2018/0373977 A1 | 12/2018 | Carbon et al. |

OTHER PUBLICATIONS

Jha, Gunjan, "Performance Analysis of Mac Units Using Various Multiplication Algorithms for Deep Learning Applications", In Master's Thesis of University of Texas, May 2018, 17 Pages.
"International Search Report and Written Opinion Issued in PCT Application No. PCT/US20/032399", dated Jul. 28, 2020, 10 Pages.

\* cited by examiner

INCREASED PRECISION NEURAL PROCESSING ELEMENT

BACKGROUND

Deep neural networks ("DNNs") are loosely modeled after information processing and communication patterns in biological nervous systems, such as the human brain. DNNs can be utilized to solve complex classification problems such as, but not limited to, object detection, semantic labeling, and feature extraction. As a result, DNNs form the foundation for many intelligence ("AI") applications, such as computer vision, speech recognition, and machine translation. DNNs can match or exceed human accuracy in many of these domains.

The high-level of performance of DNNs stems from their ability to extract high-level features from input data after using statistical learning over a large data set to obtain an effective representation of an input space. However, the superior performance of DNNs comes at the cost of high computational complexity. High performance general-purpose processors, such as graphics processing units ("GPUs"), are commonly utilized to provide the high level of computational performance required by many DNN applications.

While general-purpose processors, like GPUs, can provide a high level of computational performance for implementing DNNs, these types of processors are typically unsuitable for use in performing DNN operations over long durations in computing devices where low power consumption is critical. For example, general-purpose processors, such as GPUs, can be unsuitable for use in performing long-running DNN tasks in battery-powered portable devices, like smartphones or alternate/virtual reality ("AR/VR") devices, where the reduced power consumption is required to extend battery life.

Reduced power consumption while performing continuous DNN tasks, such as detection of human movement, can also be important in non-battery-powered devices, such as a power-over-Ethernet ("POE") security camera for example. In this specific example, POE switches can provide only a limited amount of power; reducing the power consumption of POE devices like security cameras permits the use of POE switches that provide less power.

Application-specific integrated circuits ("ASICs") have been developed that can provide performant DNN processing while at the same time reducing power consumption as compared to general-purpose processors. Despite advances in this area, however, there is a continued need to improve the performance and reduce the power consumption of ASICs that perform DNN processing, particularly for use in computing devices where the low power consumption is critical.

It is with respect to these and other technical challenges that the disclosure made herein is presented.

SUMMARY

A neural processing element capable of increased precision calculations is disclosed herein. The architecture of the neural processing element disclosed herein enables higher precision when processing operands generated by certain types of DNN layers. For example, and without limitation, a neural processing element implementing the disclosed technologies can take a signed or unsigned operand having N bits as an input. In certain situations, the neural processing element can perform operations on the operand using N+1 bits, thereby providing increased precision as compared to an architecture where the neural processing element would perform its internal computations using only N bits. Other technical benefits not specifically mentioned herein can also be realized through implementations of the disclosed subject matter.

In order to realize the technical benefits mentioned briefly above, a DNN processor is disclosed that includes neural processing elements. The neural processing elements can take signed or unsigned binary operands having N bits as inputs. In one particular implementation, the operands are signed or unsigned 8-bit binary numbers. The operands can utilize a different number of bits in other implementations.

The neural processing elements also include circuitry for performing increased precision computations on certain types of operands. For example, the neural processing elements can perform extended precision calculations for operands that are limited to positive numbers, such as operands produced by a rectified linear unit ("ReLU") layer of a DNN. Typically, a signed N-bit value output by a ReLU layer uses only N−1 bits (representing values of −127 to +128) since one bit is reserved for the sign. Using the disclosed technologies, however, a neural processing element can utilize all N bits (representing values of 0-255) of an operand produced by a ReLU layer in its internal calculations.

In order to provide increased precision, the neural processing elements are configured with a hardware AND gate. The hardware AND gate is configured to perform a logical AND operation between a binary signal (which might be referred to herein as the "sign extend signal") and a most significant bit ("MSB") of an operand. In examples where the operand is an 8-bit binary number, the MSB is bit-7 of the operand.

The state of the sign extend signal can be based upon a type of a layer of a DNN previously processed by the DNN processor. In particular, the sign extend signal can be set to logical FALSE if the operand is unsigned, such as when the operand is produced by a ReLU layer of a DNN. In this case, the sign of the operand is not extended, but rather the operand is prepended with a zero bit to make it a 9-bit signed number.

If the sign extend signal is logical TRUE (i.e. when the input is signed such as the output of a Tan h layer), then sign extension is performed on the operand. In order to perform the sign extension operation, the neural processing elements also include a concatenation circuit (a "concatenator") configured to concatenate two binary values. In particular, the concatenator concatenates the output of the hardware AND gate and the operand, thereby extending the operand from an N bit unsigned value to an N+1 bit signed value. In a configuration where the operands are 8-bit binary numbers, for instance, the output of the concatenator is a 9-bit signed binary number.

The neural processing element can also include another hardware AND gate and another concatenator for processing another operand in the manner described above. In this example, the outputs of the concatenators for both operands are provided to a hardware binary multiplier. In a configuration where the operands are 8-bit binary numbers, the output of the hardware binary multiplier is an 18-bit signed binary number. The neural processing elements can continue processing the output of the hardware binary multiplier.

It should be appreciated that the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
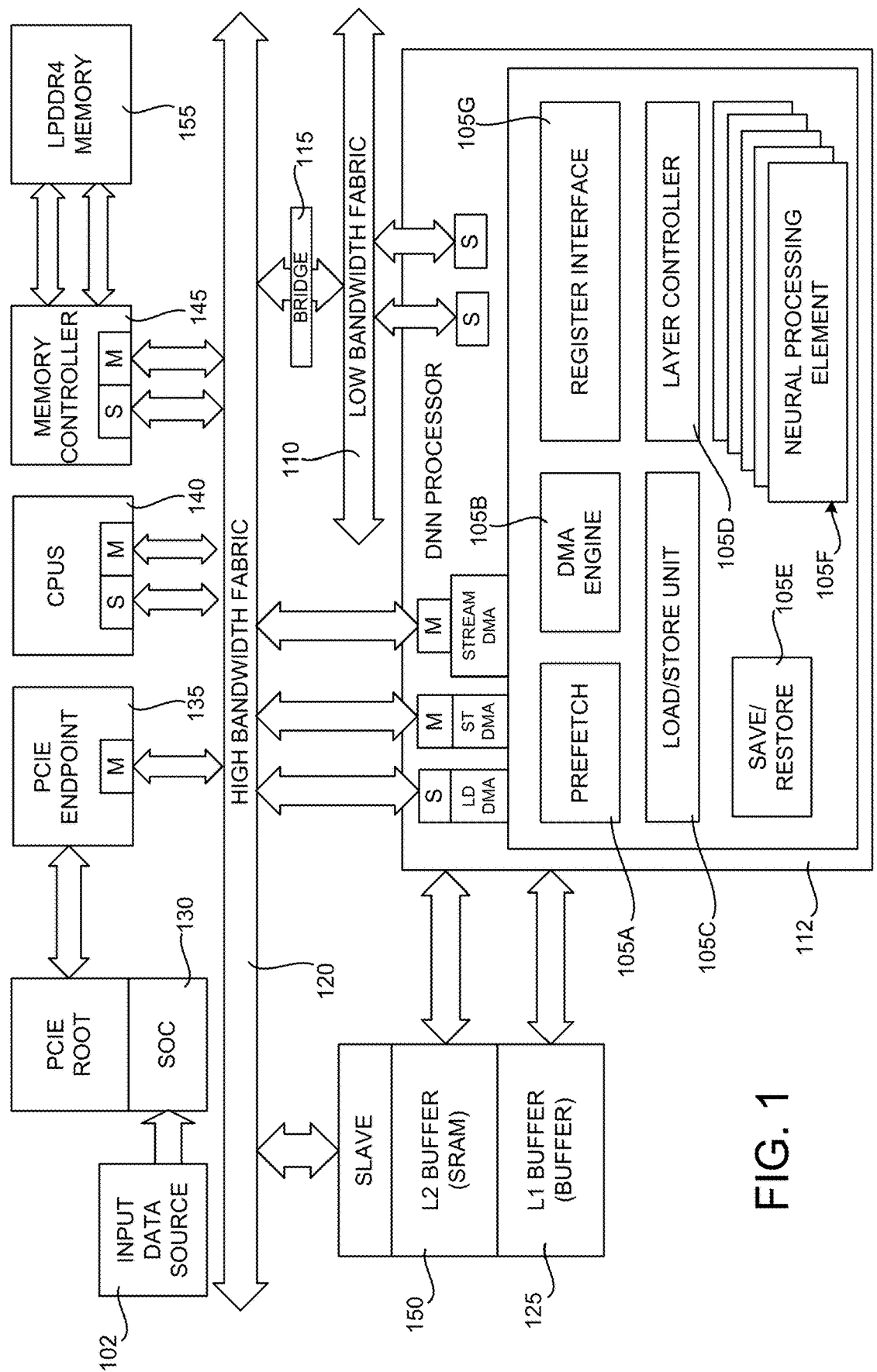
FIG. 1 is a computing architecture diagram that shows aspects of the configuration and operation of a processing system that includes a DNN processor that implements aspects of the technologies disclosed herein, according to one embodiment.

The following detailed description is directed to a neural processing element with increased precision. As discussed briefly above, implementations of the disclosed technologies can enable neural processing elements to perform their internal calculations at a higher precision when processing operands generated by certain types of DNN layers. Other technical benefits not specifically mentioned herein can also be realized through implementations of the disclosed subject matter.

While the subject matter described herein is presented in the general context of hardware neural processing elements implemented in conjunction with a hardware DNN processor, those skilled in the art will recognize that other implementations can be performed in combination with other types of computing systems and modules. Those skilled in the art will also appreciate that the subject matter described herein can be practiced with other computer system configurations, including hand-held devices, multiprocessor systems, microprocessor-based or programmable consumer electronics, computing or processing systems embedded in devices (such as wearable computing devices, automobiles, home automation etc.), minicomputers, mainframe computers, and the like.

In the following detailed description, references are made to the accompanying drawings that form a part hereof, and which are shown by way of illustration specific configurations or examples. Referring now to the drawings, in which like numerals represent like elements throughout the several FIGS., aspects of a neural processing element with increased precision will be described.

FIG. 1 is a computing architecture diagram that shows aspects of the configuration and operation of a processing system that implements the technologies disclosed herein, according to one embodiment. The processing system disclosed herein is configured in some embodiments to solve classification problems (and related problems) such as, but not limited to, eye tracking, hand tracking, object detection, semantic labeling, and feature extraction.

In order to provide this functionality, a DNN processor 112 is provided that can implement a recall-only neural network and programmatically support a wide variety of network structures. Training for the network implemented by the DNN processor 112 can be performed offline in a server farm, data center, or another suitable computing environment. The result of training a DNN is a set of parameters that can be known as "weights" or "kernels." These parameters represent a transform function that can be applied to an input with the result being a classification or semantically labeled output.

The DNN processor 112 disclosed herein can be considered a superscalar processor. The DNN processor 112 can dispatch one or more instructions to multiple execution units, called neural processing elements 105F. The execution units can be "simultaneous dispatch simultaneous complete," where each execution unit is synchronized with each of the other execution units. The DNN processor 112 can be classified as a single instruction stream, multiple data stream ("SIMD") architecture.

A neural processing element 105F is the base unit in neural networks used to loosely model a biological neural processing element in the brain. In particular, a neural processing element 105F can calculate the inner product of an input vector with a weight vector added to a bias, with an activation function applied.

Each neural processing element 105F in the DNN processor 112 is capable of performing weighted sum, max pooling, bypass, and potentially other types of operations. The neural processing elements 105F process input and weight data every clock cycle. Each neural processing element 105F is synchronized to all other neural processing elements 105F in terms of progress within a kernel to minimize the flow of kernel data within the DNN processor 112.

Each neural processing element 105F can contain a multiplier, an adder, a comparator, and a number of accumulators (not shown in FIG. 1). By having multiple accumulators, the neural processing elements 105F are able to maintain context for multiple different active kernels at a time. Each accumulator is capable of being loaded from a read of the SRAM 150 (described below). The accumulators can sum themselves with the contents of other accumulators from other neural processing elements 105F.

The DNN processor 112 accepts planar data as input, such as image data. Input to the DNN processor 112 is not, however, limited to image data. Rather, the DNN processor 112 can operate on any input data presented to the DNN processor 112 in a uniform planar format. In one particular embodiment, the DNN processor 112 can accept as input multi-planar one-byte or two-byte data frames.

Each input frame can be convolved with an N×K×H×W set of kernels, where N is the number of kernels, K is the number of channels per kernel, H is the height, and W is the width. Convolution is performed on overlapping intervals across the input data where the interval is defined by strides in the X and Y directions. These functions are performed by the neural processing elements 105F and managed by the DNN processor 112 via software-visible control registers. Other types of operations might also be performed including, but not limited to, fully connected, batch normalization, and other types of operations.

The DNN processor 112 supports multiple data types: weights; input data/feature maps; activation data; biases; and scalars. Input data/feature maps and activation data are, in most cases, two names for the same data with the distinction that when referring to an output of a layer the term activation data is used. When referring to the input of a layer the term input data/feature map is used.

The neural processing elements 105F in the DNN processor 112 compute a weighted sum of their inputs and pass the weighted sum through an "activation function" or "transfer function." The transfer function commonly has a sigmoid shape but might also take on the form of a piecewise linear function, step function, or another type of function. The activation function allows the neural processing elements 105F to train to a larger set of inputs and desired outputs where classification boundaries are non-linear.

The DNN processor 112 operates on a list of layer descriptors which correspond to the layers of a neural network. The list of layer descriptors can be treated by the DNN processor 112 as instructions. These descriptors can be pre-fetched from memory into the DNN processor 112 and executed in order. The descriptor list acts as a set of instructions to the DNN processor 112. In some configurations, two types of instructions are utilized: layer descriptors; and program instructions that get executed on a sequence controller. Software tools and/or compilers can be executed on devices external to the DNN processor 112 to create the descriptor lists that are executed on the DNN processor 112.

Generally, there can be two main classes of descriptors: memory-to-memory move ("M2M") descriptors; and operation descriptors. M2M descriptors can be used to move data to/from the main memory to/from a local buffer (i.e. the buffer 125 described below) for consumption by the operation descriptors. M2M descriptors follow a different execution pipeline than the operation descriptors. The target pipeline for M2M descriptors can be the internal DMA engine 105B or the configuration registers 105G, whereas the target pipeline for the operation descriptors can be the neural processing elements 105F.

Operational descriptors specify a specific operation that the neural processing elements 105F should perform on a data structure located in local static random-access memory ("SRAM") memory. The operational descriptors are processed in order and are capable of many different layer operations, at least some of which are described herein.

As illustrated in FIG. 1, the DNN processor 112 has a memory subsystem with a unique L1 and L2 buffer structure. The L1 and L2 buffers shown in FIG. 1 are designed specifically for neural network processing. By way of example, the L2 buffer 150 can maintain a selected storage capacity with a high speed private interface operating at a selected frequency. The L1 buffer 125 can maintain a selected storage capacity that can be split between kernel and activation data. The L1 buffer 125 might be referred to herein as the "buffer 125," and the L2 buffer 150 might be referred to herein as the SRAM 150.

Computational data (i.e. inputs data, weights and activation data) is stored in the SRAM 150 row-major in some embodiments. The computational data can be organized as two buffers, where one buffer contains input data, which might be referred to herein as the "input buffer," and the other buffer, which might be referred to herein as the "weight buffer," contains kernel weights. The buffers are filled from the SRAM 150 by the load/store unit 105C. Data is accumulated in each buffer until it has reached its predetermined capacity. The buffer data is then copied to a shadow buffer in some embodiments and presented to the neural processing elements 105F.

The DNN processor 112 can also comprise a number of other components including, but not limited to, a register interface 105G, a prefetch unit 105A, a save/restore unit 105E, a layer controller 105D, and a register interface 105G. The DNN processor 112 can include additional or alternate components in some embodiments.

The DNN processor 112 operates in conjunction with other external computing components in some configurations. For example, the DNN processor 112 is connected to a host application processor system on chip ("the host SoC") 130 in some embodiments. The DNN processor 112 can be connected to the host SoC 130 through a PCIe interface, for example. Appropriate PCIe components, such as the PCIe endpoint 135 can be utilized to enable these connections.

The Host SoC 130 serves as the application processor for the DNN processor 112. The main operating system, application, and auxiliary sensor processing are performed by the host SoC 130. The host SoC 130 can also be connected to an input data source 102, such as an external camera, that provides input data, such as image data, to the DNN processor 112. Additional central processing units ("CPUs" or "processors"), such as TENSILICA nodes 140, can also be utilized to coordinate the operation of the DNN processor 112, aspects of which will be described below.

DDR DRAM 155 can also be connected to the host SoC 130 that can be used as the main system memory. This memory is accessible from the host SoC 130 across the high bandwidth fabric 120 (e.g. PCIe bus) by way of a memory controller 145. The high bandwidth fabric 120 provides bidirectional direct memory access ("DMA") small messaging transactions and larger DMA transactions. A bridge 115 and low bandwidth fabric 110 can connect the DNN processor 112 to the host SoC 130 for sub-module configuration and other functions.

The DNN processor 112 can include a DMA engine 105B that is configured to move data to and from main memory 155. The DMA engine 105B has two channels in some embodiments. One channel is dedicated to fetching operation descriptors while the other channel is dedicated to M2M operations. A DMA descriptor can be embedded in the M2M descriptor. Descriptors in this context are DMA descriptors that are used to move the contents of memory, not to be confused with the operation descriptors described above.

To offload the local SRAM memory 150, and to provide more space for input data and weight data, the activation output can optionally be streamed directly to DDR memory 155. When streaming data to DDR memory 155, the DNN processor 112 will accumulate enough data for a burst transaction on the high bandwidth fabric 120 and will buffer enough transactions to minimize backpressure on the neural processing elements 105F. Additional details regarding the operation of the DNN processor 112 will be provided below.

Additional details regarding the operation of the DNN processor 112 will be provided below. In particular, details regarding the configuration and operation of a neural processing element 105F a neural processing element with increased precision will be provided below with regard to FIGS. 2 and 3.

Figure 2:
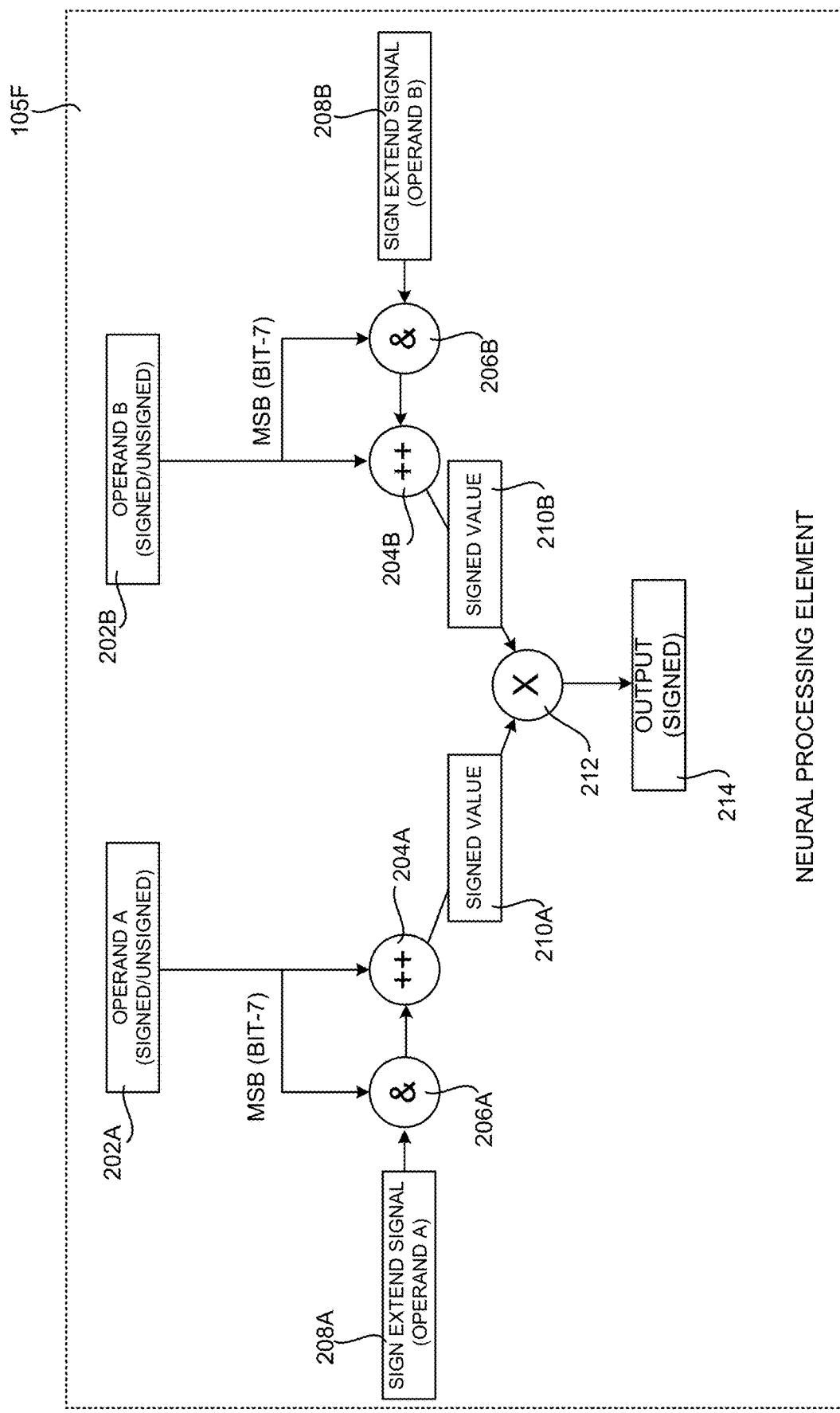
FIG. 2 is a computing architecture diagram showing aspects of the configuration of a neural processing element with increased precision, according to one embodiment.

FIG. 2 is a computing architecture diagram showing aspects of the configuration and operation of a neural processing element 105F configured for increased precision computation. As discussed briefly above, the architecture of the neural processing element 105F disclosed herein enables higher precision calculations when processing operands generated by certain types of DNN layers.

As described briefly above, the neural processing element 105F takes operands 202A and 202B (which might be referred to as "the operands 202") as inputs. The operands 202 can be N-bit signed or unsigned binary numbers, where N is a power of two. In one particular implementation, for example, the operands 202 are signed or unsigned 8-bit binary numbers. The operand 202 can be expressed using a different number of bits in other implementations.

As also described briefly above, in certain situations, such as when operands 202 are produced by a ReLU layer of a DNN, the neural processing element 105F can extend the operands 202 from N bits to N+1 bits. Typically, a signed N-bit value output by a ReLU layer uses only N−1 bits (representing values of −127 to +128 when 8 bits are used) since one bit is reserved for the sign. Using the disclosed technologies, however, a neural processing element 105F can utilize all N bits (representing values of 0-255 when 8 bits are used) of an operand 202 produced by a ReLU layer in its internal calculations.

Once an operand has been extended from N-bits to N+1 bits in the manner described below, the neural processing element 105F can operate on the N+1 bits of the extended operands, thereby providing increased precision as compared to an architecture where the neural processing element 105F would perform its internal computations using only N bits. Other technical benefits not specifically mentioned herein can also be realized through implementations of the disclosed subject matter.

In order to provide the functionality disclosed herein, the neural processing elements 105F of the DNN processor 112 include, among other things, hardware AND gates 206A and 206B. The hardware AND gate 206A is configured to perform a logical AND operation between a binary signal 208A (which might be referred to herein as the "sign extend signal 208A") and the MSB of an operand 202A. The hardware AND gate 206B is configured to perform a logical AND operation between a binary signal 208B (which might be referred to herein as the "sign extend signal 208B") and the MSB of an operand 202B. The sign extend signals 208 are a 1-bit binary numbers in some configurations.

In the example shown in FIG. 2, the operands 202A and 202B are 8-bit binary numbers. Accordingly, the hardware AND gate 206A is configured to perform a logical AND operation between the sign extend signal 208A and bit-7 of operand 202A. Similarly, the hardware AND gate 206B is configured to perform a logical AND operation between the sign extend signal 208B and bit-7 of operand 202B.

As discussed briefly above, the state of the sign extend signals 208 can be set based upon a type of a layer of a DNN previously processed by the DNN processor 112. In particular, the sign extend signal 208A can be set to logical FALSE if the operand 202A is unsigned, such as when the operand 202A is produced by a ReLU layer of a DNN. Similarly, the sign extend signal 208B can be set to logical FALSE if the operand 202B is unsigned, such as when it is produced by a ReLU layer of a DNN. The neural processing element 105F might also set the sign extend signals 208 to logical FALSE when operands 202 are generated by DNN layers that can only take on positive values.

In general, the sign extend signals 208 can be set based upon the type of activation function (i.e. non-linearity) applied in the immediately previously processed layer of the DNN. Information identifying the non-linearity applied in the previous layer of the DNN is provided during processing of the current layer in order to set the sign extend signals 208. In some configurations, a user can specific the particular activation functions for which the sign extend signals 208 are to be logical TRUE or logical FALSE.

When the sign extend signals 208 are TRUE, the neural processing elements 105F perform a sign extension operation. This might occur when the previous layer of a DNN is a Tan h ("hyperbolic tangent") layer that produces signed outputs.

In order to perform the sign extension operation, the neural processing elements also include concatenation circuits 204A and 204B (which might be referred to herein as a "concatenator 204A or 204B"). The concatenators 204A and 204B are circuits configured to concatenate two binary values.

The concatenator 204A concatenates the 1-bit output of the hardware AND gate 206A and the operand 202A, thereby extending the operand from an N bit value to an N+1 bit value. Similarly, the concatenator 204B concatenates the 1-bit output of the hardware AND gate 206B and the operand 202B, thereby extending the operand from an N bit value to an N+1 bit value. In a configuration where the operands 202 are 8-bit binary numbers, as shown in FIG. 2 for instance, the output of the concatenators 204 are 9-bit signed binary numbers.

The signed output 210A and the signed output 210B of the concatenators 204A and 204B, respectively, are communicated to a hardware binary multiplier 212. The hardware binary multiplier 212 is a circuit configured to multiply two binary numbers, the outputs 210A and 210B in this case. In the example shown in FIG. 2, where the outputs 210 are 9-bit signed binary numbers, the output 214 of the hardware binary multiplier 212 is an 18-bit signed binary number. The output 214 of the multiplier 212 can be provided to other components within the neural processing element 105F for additional processing.

Figure 3A:
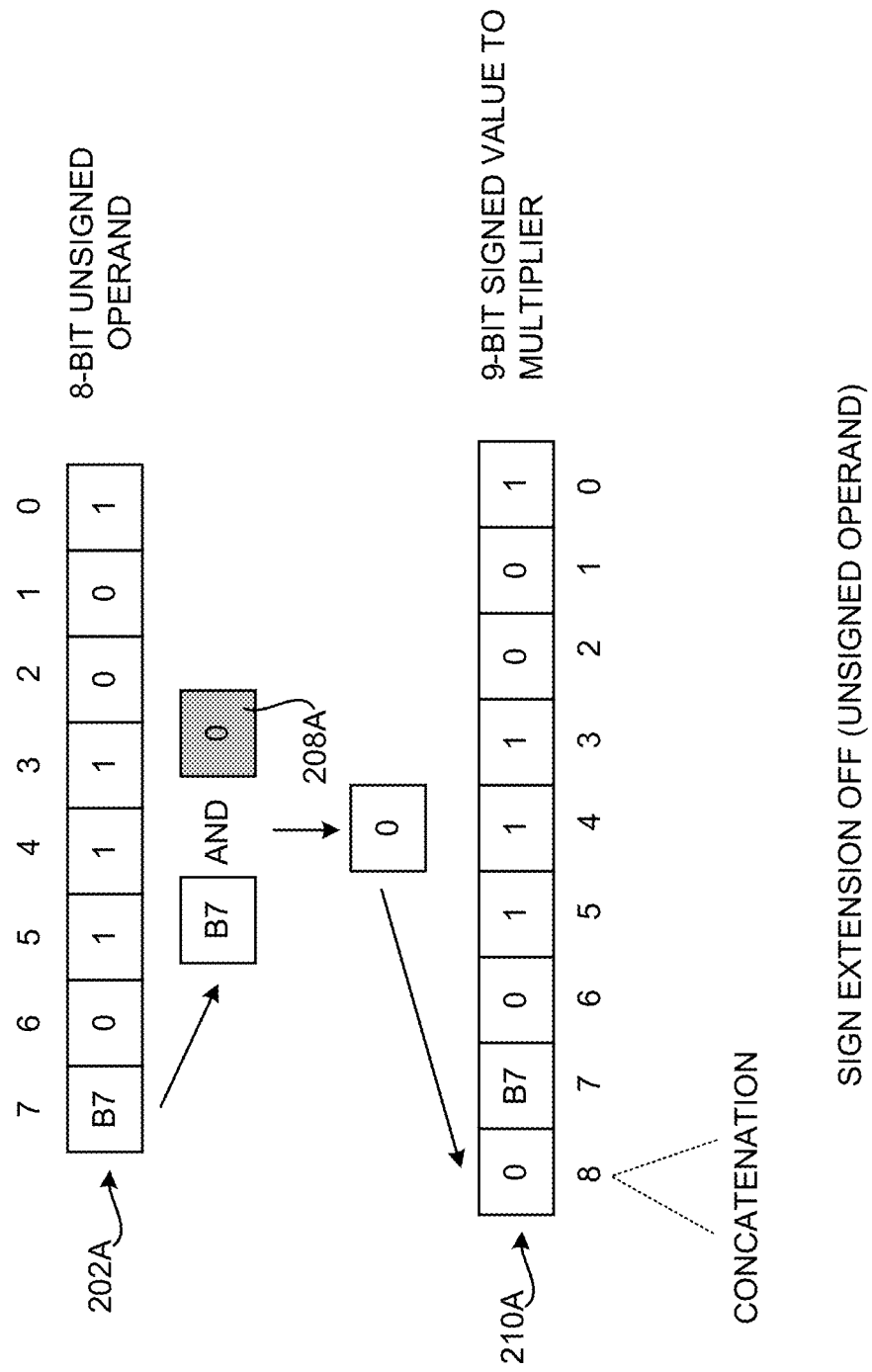
FIG. 3A is a data diagram showing an illustrative example of the operation of a neural processing element configured using the disclosed technologies.

FIG. 3A is a data diagram showing an illustrative example of the operation of a neural processing element 105F configured using the disclosed technologies. In this example, the operand 202A is an 8-bit unsigned binary number, such as that output by a ReLU layer of a DNN. In this example, the sign extension signal 208A is set to a logical FALSE (i.e. zero in the illustrated example) since the operand is unsigned Accordingly, the output 210A of the AND gate 206A is zero regardless of the value of bit-7 of the operand 202A.

As described above, the output of the AND gate 206A (i.e. zero) is concatenated (i.e. prepended to) with the operator 202A. In the illustrated example, for instance, the output 210A of the AND gate 206A is concatenated with the operand 202A, thereby converting the 8-bit operand 202A into a 9-bit signed binary number. In this way, bit-0 to bit-7 of the operand 204A can be used to represent a binary number (e.g. a positive number with values from 0-255). The 9-bit signed output 210A is provided to the multiplier 212.

Figure 3B:
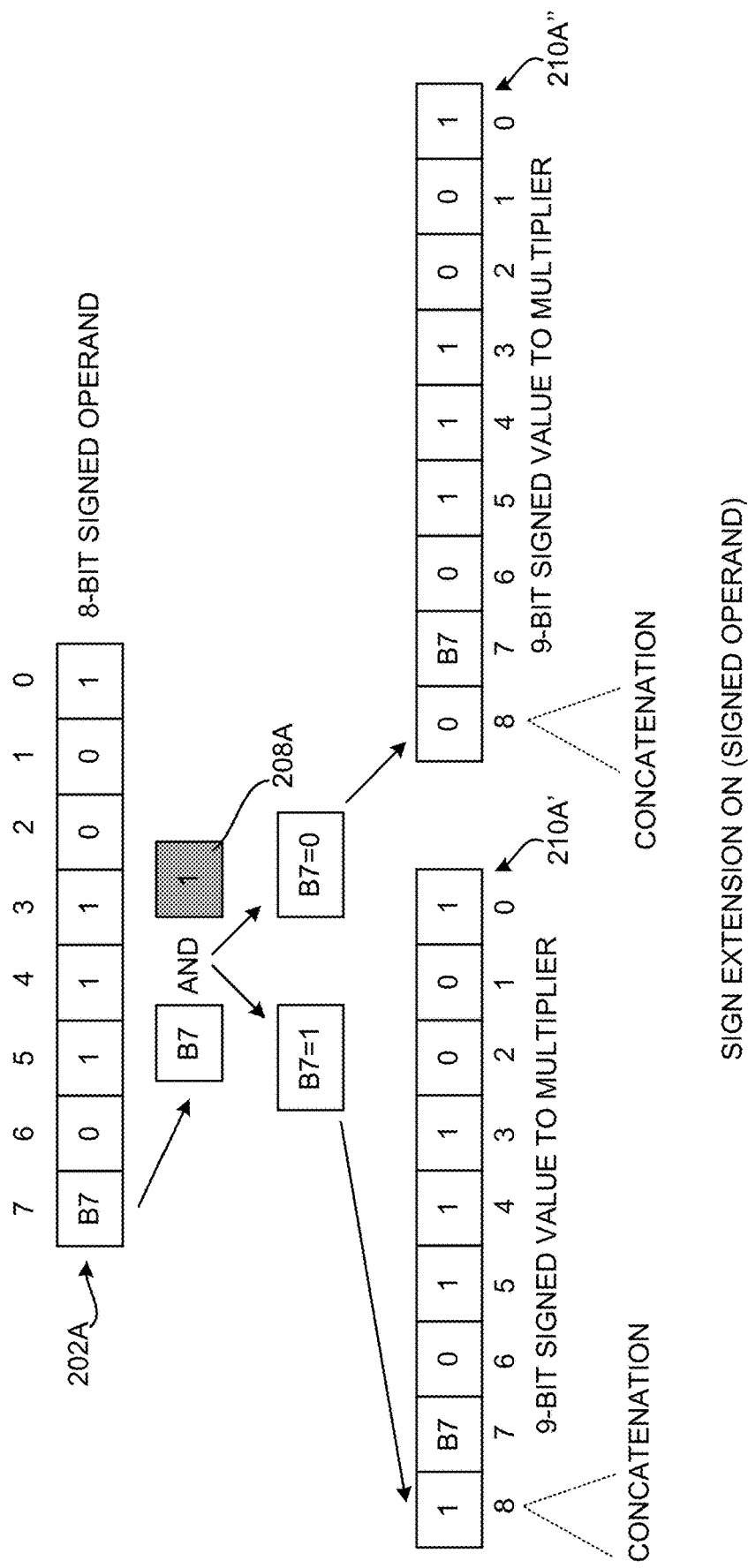
FIG. 3B is a data diagram showing another illustrative example of the operation of a neural processing element configured using the disclosed technologies.

FIG. 3B is a data diagram showing another illustrative example of the operation of a neural processing element 105F configured using the disclosed technologies. The operand 202A shown in FIG. 3B is the same as that shown in the example presented in FIG. 3A and described above. In this example, however, the sign extension signal 208A is set to a logical TRUE (i.e. one in the illustrated example). Accordingly, the output 210A of the AND gate 206A is one if bit-7 (i.e. the MSB) of the operand 202A is one and is zero if bit-7 (i.e. the MSB) of the operand 202A is zero.

As described above, the output of the AND gate 206A is concatenated (i.e. prepended to) with the operand 202A. In the illustrated example, for instance, an $8^{th}$ bit is added to the operand 202A. If the value of bit-7 of the operand 202A is one, the value of the $8^{th}$ bit is set to one (shown in FIG. 3B as output 210A'). If the value of bit-7 of the operation 202A is zero, the value of the $8^{th}$ bit is set to zero (shown in FIG. 3B as 210A"). In this manner, the value of the sign bit can be retained for signed operands 202 that might be positive or negative. The 9-bit signed output 210A is provided to the multiplier 212 for use in the manner described above. It is to be appreciated that while FIGS. 3A and 3B are illustrated with respect to an 8-bit operand, the same operations can be applied to operands having other numbers of bits.

Figure 4:
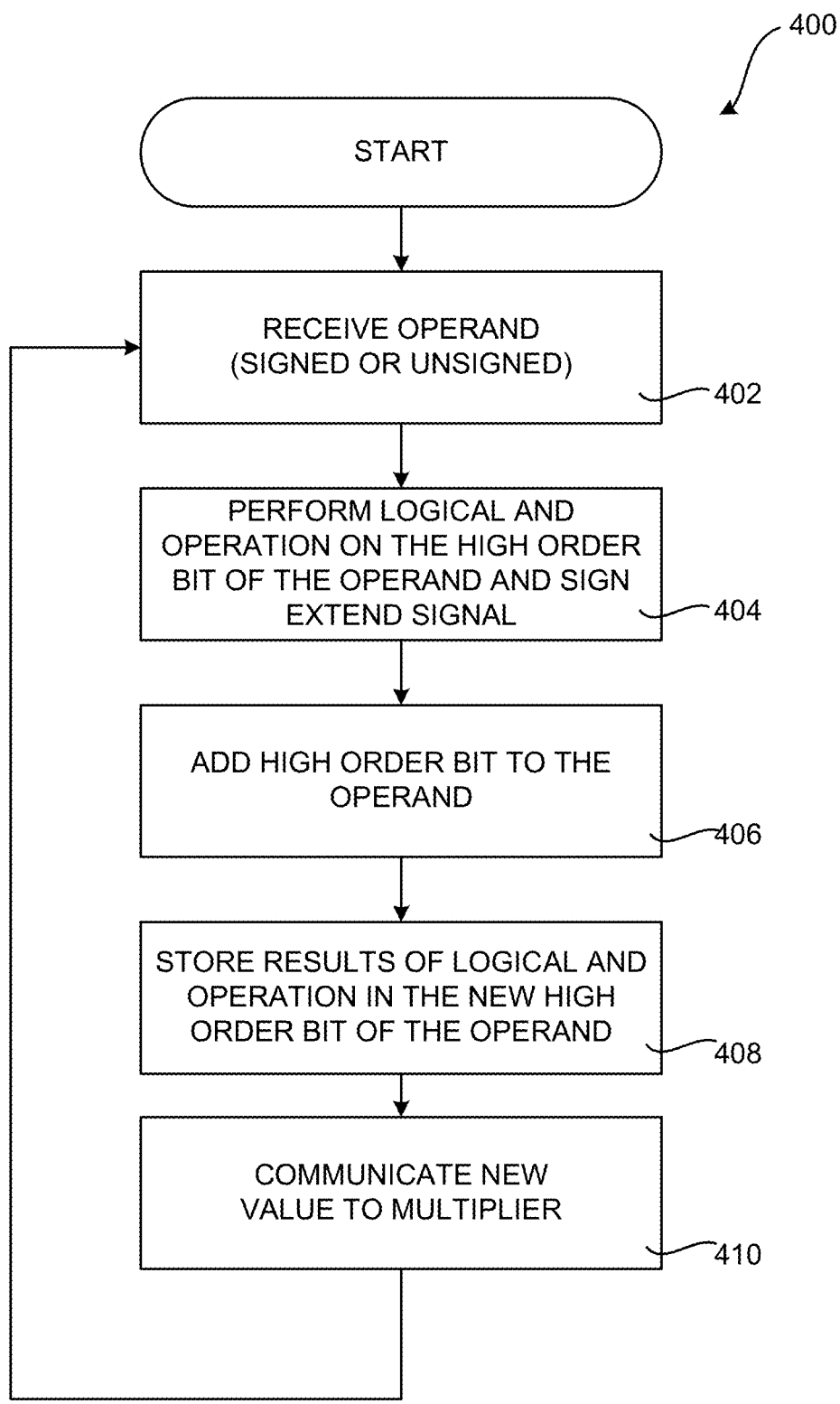
FIG. 4 is a flow diagram showing a routine that illustrates aspects of the operation of the operation of the neural processing element illustrated in FIG. 2, according to one embodiment disclosed herein.

FIG. 4 is a flow diagram showing a routine 400 that illustrates aspects of the operation of the neural processing element 105F configured for increased precision described above with reference to FIGS. 1-3B, according to one embodiment disclosed herein. It should be appreciated that the logical operations described herein with regard to FIG. 4, and the other FIGS., can be implemented (1) as a sequence of computer implemented acts or program modules running on a computing device and/or (2) as interconnected machine logic circuits or circuit modules within a computing device.

The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the FIGS. and described herein. These operations can also be performed in a different order than those described herein.

The routine 400 begins at operation 402, where a signed or unsigned binary operand 202 is received. As discussed above, the operand 202 is 8-bits in one particular implementation, but might be expressed using another number of bits in other configurations.

From operation 402, the routine 400 proceeds to operation 404, where an AND gate 206 performs a logical AND operation on the MSB of the operand 202 and the sign extend signal 208. As discussed above, the sign extend signal 208 is a single bit signal in one embodiment. The sign extend signal 208 indicates whether a sign extension operation is to be performed on the operand 202 received at operation 402.

From operation 404, the routine 400 proceeds to operation 406, where a new MSB is added to the N-bit operand 202 to create an N+1 bit signed binary value 210. The routine 400 then proceeds to operation 408, where the result of the logical AND operation performed at operation 404 is stored in the new MSB of the N+1-bit signed value 210. As discussed above, these operations are performed through concatenation in some embodiments.

From operation 408, the routine 400 proceeds to operation 410, where the concatenator 204 communicates the 9-bit signed value to the multiplier 212. The routine 400 then proceeds back to operation 402, where additional operands 202 can be processed in the manner described above.

Figure 5:
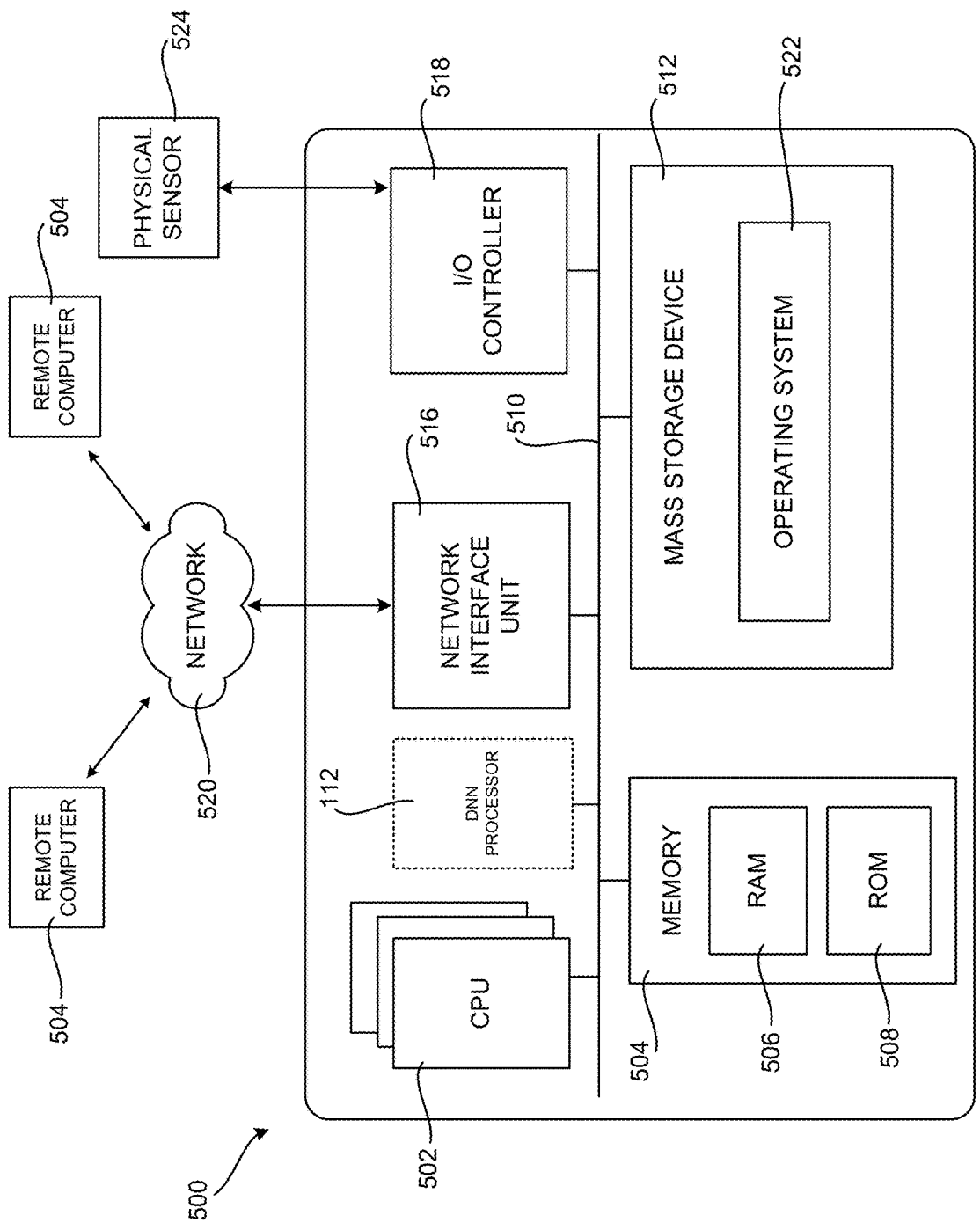
FIG. 5 is a computer architecture diagram showing an illustrative computer hardware and software architecture for a computing device that can act as an application host for a DNN processor that includes neural processing elements having increased precision, according to one embodiment.

FIG. 5 is a computer architecture diagram showing an illustrative computer hardware and software architecture for a computing device that can act as an application host for the DNN processor 112 presented herein. In particular, the architecture illustrated in FIG. 5 can be utilized to implement a server computer, mobile phone, an e-reader, a smartphone, a desktop computer, an AR/VR device, a tablet computer, a laptop computer, or another type of computing device suitable for use with the DNN processor 112.

The computer 500 illustrated in FIG. 5 includes a central processing unit 502 ("CPU"), a system memory 504, including a random-access memory 506 ("RAM") and a read-only memory ("ROM") 508, and a system bus 510 that couples the memory 504 to the CPU 502. A basic input/output system ("BIOS" or "firmware") containing the basic routines that help to transfer information between elements within the computer 500, such as during startup, can be stored in the ROM 508. The computer 500 further includes a mass storage device 512 for storing an operating system 522, application programs, and other types of programs. The mass storage device 512 can also be configured to store other types of programs and data.

The mass storage device 512 is connected to the CPU 502 through a mass storage controller (not shown) connected to the bus 510. The mass storage device 512 and its associated computer readable media provide non-volatile storage for the computer 500. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 500. For purposes of the claims, the phrase "computer storage medium," and variations thereof, does not include waves or signals per se or communication media.

According to various configurations, the computer 500 can operate in a networked environment using logical connections to remote computers through a network such as the network 520. The computer 500 can connect to the network 520 through a network interface unit 516 connected to the bus 510. It should be appreciated that the network interface unit 516 can also be utilized to connect to other types of networks and remote computer systems. The computer 500 can also include an input/output controller 518 for receiving and processing input from a number of other devices, including a keyboard, mouse, touch input, an electronic stylus (not shown in FIG. 5), or a physical sensor such as a video camera. Similarly, the input/output controller 518 can provide output to a display screen or other type of output device (also not shown in FIG. 5).

It should be appreciated that the software components described herein, when loaded into the CPU 502 and executed, can transform the CPU 502 and the overall computer 500 from a general-purpose computing device into a special-purpose computing device customized to facilitate the functionality presented herein. The CPU 502 can be constructed from any number of transistors or other discrete circuit elements, which can individually or collectively assume any number of states. More specifically, the CPU 502 can operate as a finite-state machine, in response to executable instructions contained within the software modules disclosed herein. These computer-executable instructions can transform the CPU 502 by specifying how the CPU 502 transitions between states, thereby transforming the transistors or other discrete hardware elements constituting the CPU 502.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 500 in order to store and execute the software components presented herein. It also should be appreciated that the architecture shown in FIG. 5 for the computer 500, or a similar architecture, can be utilized to implement other types of computing devices, including hand-held computers, video game devices, embedded computer systems, mobile devices such as smartphones, tablets, and AR/VR devices, and other types of computing devices known to those skilled in the art. It is also contemplated that the computer 500 might not include all of the components shown in FIG. 5, can include other components that are not explicitly shown in FIG. 5, or can utilize an architecture completely different than that shown in FIG. 5.

Figure 6:
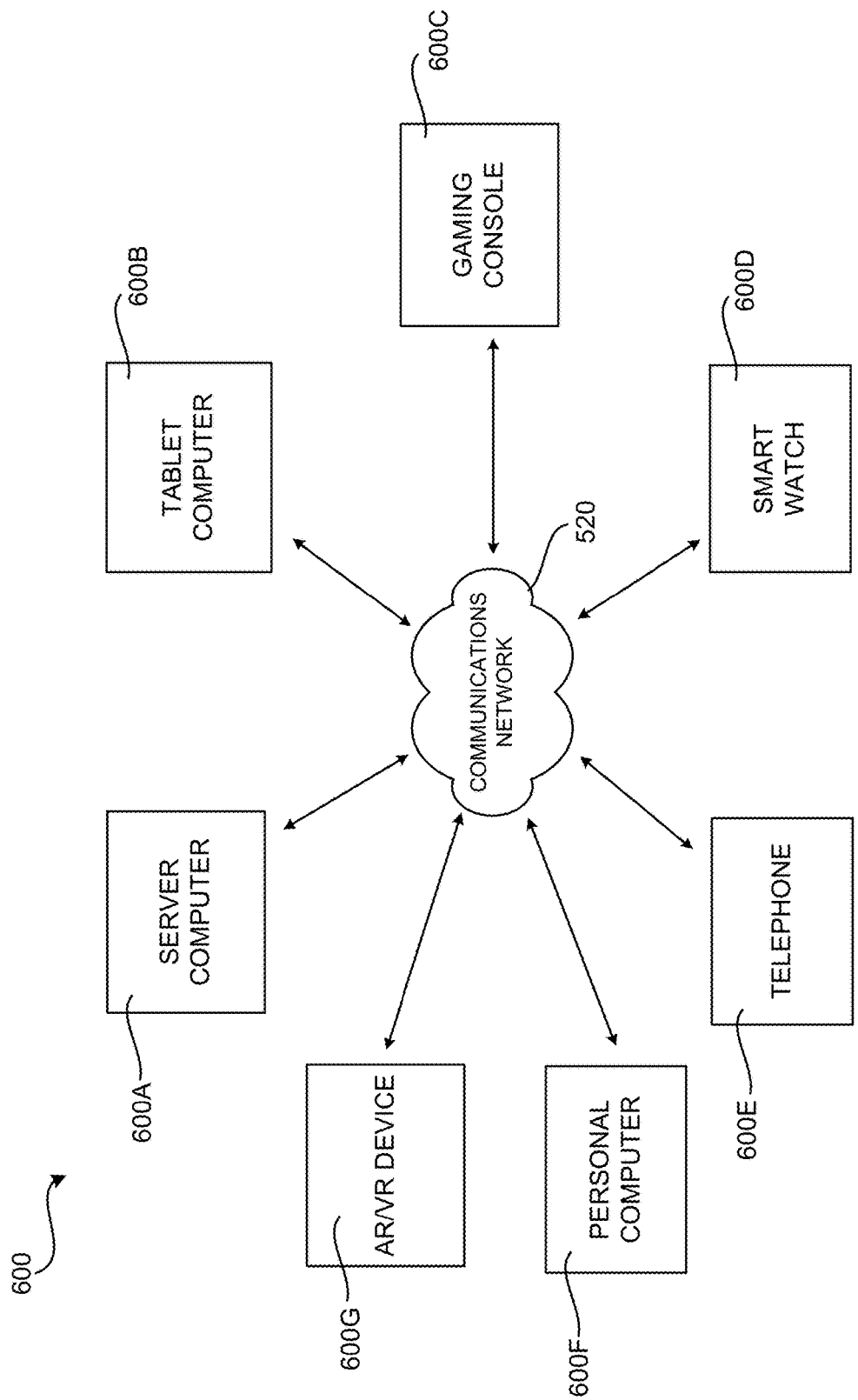
FIG. 6 is a network diagram illustrating a distributed computing environment in which aspects of the disclosed technologies can be implemented, according to various embodiments presented herein.

FIG. 6 is a network diagram illustrating a distributed network computing environment 600 in which aspects of the disclosed technologies can be implemented, according to various embodiments presented herein. As shown in FIG. 6, one or more server computers 600A can be interconnected via a communications network 520 (which may be either of, or a combination of, a fixed-wire or wireless LAN, WAN, intranet, extranet, peer-to-peer network, virtual private network, the Internet, Bluetooth communications network, proprietary low voltage communications network, or other communications network) with a number of client computing devices such as, but not limited to, a tablet computer 600B, a gaming console 600C, a smart watch 600D, a telephone 600E, such as a smartphone, a personal computer 600F, and an AR/VR device 600G.

In a network environment in which the communications network 520 is the Internet, for example, the server computer 600A can be a dedicated server computer operable to process and communicate data to and from the client computing devices 600B-600G via any of a number of known protocols, such as, hypertext transfer protocol ("HTTP"), file transfer protocol ("FTP"), or simple object access protocol ("SOAP"). Additionally, the networked computing environment 600 can utilize various data security protocols such as secured socket layer ("SSL") or pretty good privacy ("PGP"). Each of the client computing devices 600B-600G can be equipped with an operating system operable to support one or more computing applications or terminal sessions such as a web browser (not shown in FIG. 6), or other graphical user interface (not shown in FIG. 6), or a mobile desktop environment (not shown in FIG. 6) to gain access to the server computer 600A.

The server computer 600A can be communicatively coupled to other computing environments (not shown in FIG. 6) and receive data regarding a participating user's interactions/resource network. In an illustrative operation, a user (not shown in FIG. 6) may interact with a computing application running on a client computing device 600B-600G to obtain desired data and/or perform other computing applications.

The data and/or computing applications may be stored on the server 600A, or servers 600A, and communicated to cooperating users through the client computing devices 600B-600G over an exemplary communications network 620. A participating user (not shown in FIG. 6) may request access to specific data and applications housed in whole or in part on the server computer 600A. These data may be communicated between the client computing devices 600B-600G and the server computer 600A for processing and storage.

The server computer 600A can host computing applications, processes and applets for the generation, authentication, encryption, and communication of data and applications, and may cooperate with other server computing environments (not shown in FIG. 6), third party service providers (not shown in FIG. 6), network attached storage ("NAS") and storage area networks ("SAN") to realize application/data transactions.

It should be appreciated that the computing architecture shown in FIG. 5 and the distributed network computing environment shown in FIG. 6 have been simplified for ease of discussion. It should also be appreciated that the computing architecture and the distributed computing network can include and utilize many more computing components, devices, software programs, networking devices, and other components not specifically described herein.

The disclosure presented herein also encompasses the subject matter set forth in the following clauses:

Clause 1. A deep neural network (DNN) processor, comprising a plurality of neural processing elements, each of the plurality of neural processing elements comprising a first hardware AND gate configured to perform a logical AND operation between a first sign extend signal and a most significant bit (MSB) of a first operand 202A, a first concatenator configured to concatenate an output of the first hardware AND gate and the first operand and provide a first output to a hardware binary multiplier, a second hardware AND gate configured to perform a logical AND operation between a second sign extend signal and a MSB of a second operand, and a second concatenator configured to concatenate an output of the second hardware AND gate and the second operand and provide a second output to the hardware binary multiplier Clause 2. The deep neural network processor of clause 1, wherein the first operand and the second operand comprise signed or unsigned binary 8-bit numbers Clause 3. The deep neural network processor of any of clauses 1 or 2, wherein the first output and the second output comprise 9-bit signed binary numbers.

Clause 4. The deep neural network processor of any of clauses 1-3, wherein an output of the hardware binary multiplier comprises a signed 18-bit binary number Clause 5. The deep neural network processor of any of clauses 1-4, wherein the MSB of the first operand comprises bit-7 of an 8-bit signed or unsigned binary number.

Clause 6. The deep neural network processor of any of clauses 1-5, wherein the MSB of the second operand comprises bit-7 of an 8-bit signed or unsigned binary number.

Clause 7. The deep neural network processor of any of clauses 1-6, wherein a state of the first sign extend signal or the second sign extend signal is based upon a type of a layer of a DNN previously processed by the DNN processor.

Clause 8. The deep neural network processor of any of clauses 1-7, wherein the layer of the DNN previously processed by the DNN processor comprises a ReLU layer.

Clause 9. A computer-implemented method, comprising: performing a logical AND operation between a first sign extend signal and a most significant bit (MSB) of a first operand; concatenating an output of the first hardware AND gate and the first operand; and communicating a result of the concatenation of the output of the first hardware AND gate and the first operand to a hardware binary multiplier.

Clause 10. The computer-implemented method of clause 9, further comprising: performing a logical AND operation between a second sign extend signal and a MSB of a second operand; concatenating an output of the second hardware AND gate and the second operand; and communicating a result of the concatenation of the second hardware AND gate and the second operand to the hardware binary multiplier.

Clause 11. The computer-implemented method of any of clauses 9 or 10, wherein the first operand and the second operand comprise signed or unsigned binary 8-bit numbers Clause 12. The computer-implemented method of any of clauses 9-11, wherein the result of the concatenation of the output of the first hardware AND gate and the first operand and the result of the concatenation of the second hardware AND gate and the second operand comprise 9-bit signed binary numbers.

Clause 13. The computer-implemented method of any of clauses 9-12, wherein an output of the hardware binary multiplier comprises a signed 18-bit binary number.

Clause 14. The computer-implemented method of any of clauses 9-13, wherein a state of the first sign extend signal or the second sign extend signal is based upon a type of a layer of a deep neural network (DNN) previously processed by a DNN processor.

Clause 15. The computer-implemented method of any of clauses 9-14, wherein the layer of the DNN previously processed by the DNN processor comprises a ReLU layer.

Clause 16. A deep neural network (DNN) processor comprising a plurality of neural processing elements, each of the neural processing elements configured to: receive an 8-bit operand, the 8-bit operand comprising a signed binary 8-bit operand or an unsigned 8-bit operand; perform a logical AND operation on a most significant bit (MSB) of the 8-bit operand and a binary signal indicating whether a sign extension operation is to be performed on the 8-bit operand; add a new MSB to the 8-bit operand to create a 9-bit signed binary value; store a result of the logical AND operation in the new MSB of the 9-bit signed value; and communicate the 9-bit signed value to a multiplier.

Clause 17. The DNN processor of clause 16, wherein the plurality of neural processing elements are further configured to: receive a second 8-bit operand, the second 8-bit operand comprising a signed binary 8-bit operand or an unsigned 8-bit operand; perform a logical AND operation on a most significant bit (MSB) of the second 8-bit operand and a second binary signal indicating whether a sign extension operation is to be performed on the second 8-bit operand; add anew MSB to the second 8-bit operand to create a second 9-bit signed binary value; store a result of the logical AND operation in the new MSB of the second 9-bit signed value; and communicate the second 9-bit signed value to the multiplier.

Clause 18. The DNN processor of any of clauses 16-17, wherein an output of the hardware binary multiplier comprises a signed 18-bit binary number.

Clause 19. The DNN processor of any of clauses 16-18, wherein a state of the binary signal is based upon a type of a layer of a DNN previously processed by the DNN processor.

Clause 20. The DNN processor of any of clauses 16-19, wherein the binary signal indicating whether a sign extension operation is to be performed on the 8-bit operand is set based upon a non-linearity applied in a layer of a DNN previously processed by the DNN processor.

Based on the foregoing, it should be appreciated that a neural processing element capable of providing increased precision has been disclosed herein. Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A deep neural network (DNN) processor, comprising a plurality of neural processing elements, each of the plurality of neural processing elements comprising
   a first hardware AND gate configured to perform a logical AND operation between a first sign extend signal and a most significant bit (MSB) of a first operand,
   a first concatenator configured to concatenate an output of the first hardware AND gate and the first operand and provide a first output to a hardware binary multiplier,
   a second hardware AND gate configured to perform a logical AND operation between a second sign extend signal and a MSB of a second operand, and
   a second concatenator configured to concatenate an output of the second hardware AND gate and the second operand and provide a second output to the hardware binary multiplier.

2. The deep neural network processor of claim 1, wherein the first operand and the second operand comprise signed or unsigned binary 8-bit numbers.

3. The deep neural network processor of claim 1, wherein the first output and the second output comprise 9-bit signed binary numbers.

4. The deep neural network processor of claim 1, wherein an output of the hardware binary multiplier comprises a signed 18-bit binary number.

5. The deep neural network processor of claim 1, wherein the MSB of the first operand comprises bit-7 of an 8-bit signed or unsigned binary number.

6. The deep neural network processor of claim 1, wherein the MSB of the second operand comprises bit-7 of an 8-bit signed or unsigned binary number.

7. The deep neural network processor of claim 1, wherein a state of the first sign extend signal or the second sign extend signal is based upon a type of a layer of a DNN previously processed by the DNN processor.

8. The deep neural network processor of claim 7, wherein the layer of the DNN previously processed by the DNN processor comprises a ReLU layer.

9. A computer-implemented method, comprising:
   performing a logical AND operation, by way of a first hardware AND gate, between a first sign extend signal and a most significant bit (MSB) of a first operand;
   concatenating an output of the first hardware AND gate and the first operand;
   performing a logical AND operation, by way of a second hardware AND gate, between a second sign extend signal and a MSB of a second operand;
   concatenating an output of the second hardware AND gate and the second operand; and
   communicating a result of the concatenation of the output of the first hardware AND gate and the first operand and a result of the concatenation of the output of the second hardware AND gate and the second operand to a hardware binary multiplier.

10. The computer-implemented method of claim 9, wherein the first operand and the second operand comprise signed or unsigned binary 8-bit numbers.

11. The computer-implemented method of claim 9, wherein the result of the concatenation of the output of the first hardware AND gate and the first operand and the result of the concatenation of the output of the second hardware AND gate and the second operand comprise 9-bit signed binary numbers.

12. The computer-implemented method of claim 11, wherein an output of the hardware binary multiplier comprises a signed 18-bit binary number.

13. The computer-implemented method of claim 12, wherein a state of the first sign extend signal or the second sign extend signal is based upon a type of a layer of a deep neural network (DNN) previously processed by a DNN processor.

14. The computer-implemented method of claim 13, wherein the layer of the DNN previously processed by the DNN processor comprises a ReLU layer.

15. A deep neural network (DNN) processor comprising a plurality of neural processing elements, each of the neural processing elements configured to:
   receive an 8-bit operand, the 8-bit operand comprising a signed binary 8-bit operand or an unsigned 8-bit operand;
   perform a logical AND operation on a most significant bit (MSB) of the 8-bit operand and a binary signal indicating whether a sign extension operation is to be performed on the 8-bit operand;
   add a new MSB to the 8-bit operand to create a first 9-bit signed binary value;
   store a result of the logical AND operation in the new MSB of the first 9-bit signed value;
   receive a second 8-bit operand, the second 8-bit operand comprising a signed binary 8-bit operand or an unsigned 8-bit operand;
   perform a logical AND operation on a most significant bit (MSB) of the second 8-bit operand and a second binary signal indicating whether a sign extension operation is to be performed on the second 8-bit operand;
   add a new MSB to the second 8-bit operand to create a second 9-bit signed binary value;
   store a result of the logical AND operation in the new MSB of the second 9-bit signed value; and
   communicate the first 9-bit signed value and the second 9-bit signed value to a multiplier.

16. The DNN processor of claim 15, wherein an output of the hardware binary multiplier comprises a signed 18-bit binary number.

17. The DNN processor of claim 16, wherein a state of the binary signal is based upon a type of a layer of a DNN previously processed by the DNN processor.

18. The DNN processor of claim 15, wherein the binary signal indicating whether a sign extension operation is to be performed on the 8-bit operand is set based upon a non-linearity applied in a layer of a DNN previously processed by the DNN processor.

* * * * *